United States Patent Office 2,881,692
Patented Apr. 14, 1959

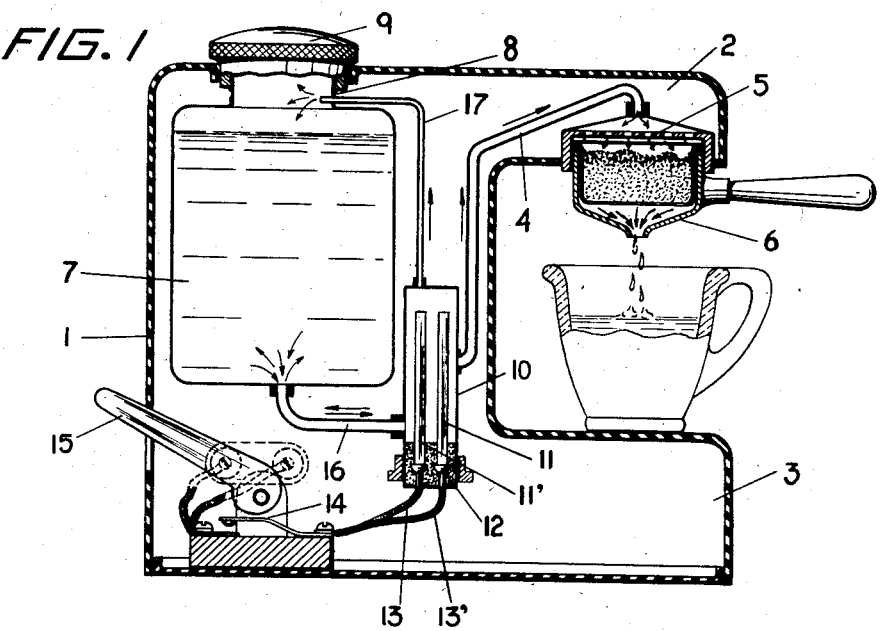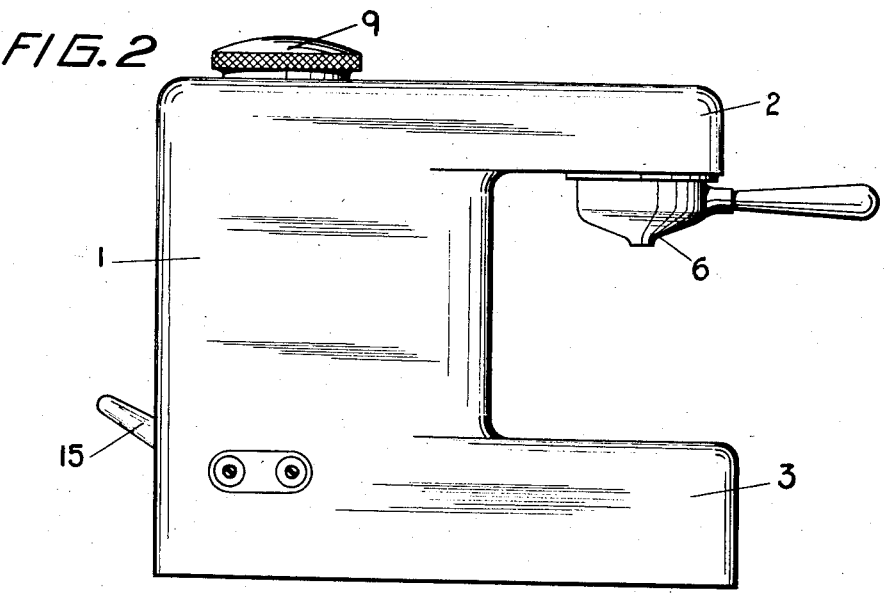

2,881,692

ELECTRIC APPARATUS OF AUTOMATICALLY PULSATING ACTION FOR PREPARING INFUSIONS THROUGH DISTILLATION

Vittorio Volcov, Bella Vista, Argentina

Application September 25, 1956, Serial No. 611,877

3 Claims. (Cl. 99—300)

The present invention is related to an electric apparatus of automatically pulsating action for preparing infusions through distillation.

The primary object of the invention is to use electric current only when the apparatus is in use.

Another object is to prepare infusions instantaneously, without any preheating.

Lastly, as in any other electric apparatus, absolute safety is aimed at.

These and other objects of the invention will be pointed out in the following description and claims and illustrated in the accompanying drawing, which discloses, by way of example, the principle of the invention and a preferred embodiment thereof.

In the drawings:

Figure 1 is a longitudinal vertical section of the apparatus, and

Figure 2 is a side view of the same.

Referring now more particularly to the drawing, the apparatus consists of a casing 1 covered with an insulating material (enamelled or painted with insulating material) or made of an easily modelled and resistant insulating material, the outer shape of which is roughly that of the conventional machines of this type, i.e. it has an upper bulge 2 and a flat platform 3 underneath the same. At the lower face of the bulge 2 ends a pipe 4 through which flows boiling water. This outlet is closed by a conventional filter 5 and is provided furthermore with holding means for removably fixing the container 6 for the granulated material, whose form and working are of public knowledge. Drops of the distilled infusion fall through an opening at the bottom of the said container 6 and are collected in a cup placed upon the platform 3. All these elements are known in the art and do not form part of the invention.

The casing 1 houses a tank 7 which is filled with water through the opening 8 made in the upper wall of the tank 7 and in the casing 1, and which is closed by means of a preferably threaded lid 9. The casing 1 houses furthermore a small and narrow vertical boiler 10, electrically insulated from the rest of the apparatus, and which contains two vertical, long electrodes 11, 11'. These electrodes 11, 11' are stuck into a plug 12, made of an insulating material so as to be insulated as to each other and from the boiler 10. Electric conductors 13, 13' connect the said electrodes 11, 11' with the electric lines through a bipolar switch 14 operating from without by means of a lever 15. The same effect is obtained if the plug 12 with the electrodes 11, 11' is placed in the upper portion of the boiler 10 so that the tips of the electrodes 11, 11' point downward.

Three pipes end in the boiler 10. One of them 4 feeds the steam and hot water from the boiler 10 to the load of granulated material 6 and its diameter is somewhat larger than that of the other two. The latter in their turn connect the boiler 10 with the water tank 7; one pipe 16 communicating the bottom of the tank 7 with the lower portion of the boiler 10, whilst the second pipe 17 connects the upper portion of the said boiler 10 with the upper portion of the tank 7.

The boiler 10 is placed on a somewhat lower level than the tank 7 and considerably lower than the outlet of the pipe 4, so as to prevent that the cold water from the tank would enter into the container 6 of the granulated material.

It has been found that a better working is obtained when the pipe 4 starts at an approximately intermediate height of the boiler 10 between the levels defined by the mouths of the other two pipes 16, 17, which connect the boiler 10 with the tank 7.

When the tank 7 is filled with water, the latter enters through the pipe 16 into the boiler 10 filling the same as well as the pipes 4 and 17 up to the level of the tank 7 without however reaching the filter 5 due to the difference of levels.

When the lever 15 is pressed, the circuit is closed and the current flows between the electrodes 11, 11' through the water in the boiler 10 causing, due to the small quantity of water, a violent evaporation of the same. The steam thus obtained leaves the boiler 10 under pressure and goes through the three pipes 4, 16, 17. The portion passing through the wider pipe 4 carries along drops of boiling water, passes through the filter 5 and starts the extraction of the material stored in the container 6. The steam leaving through the pipe 16 closes momentarily the flow of water from the tank 7 to the little boiler 10 until, contacting the cold water in the tank 7, it condenses. Lastly, the steam entering the tank 7 through the upper pipe 17 increases the pressure in the said tank 7 and after the disappearance of the counter-pressure coming from the lower pipe 16, speeds up the filling of the little boiler 10, in which the electric circuit is restored.

The second cycle and the following cycles differ from the first cycle. Due to the vertical and narrow shape of the boiler 10 and the vertical mounting of the electrodes 11, 11' the latter enter into action only gradually according to the level of the water covering them. This allows of a gradual heating of the water, and the heat thus produced increases with the level of the water to reach its maximum when the whole of the boiler 10 is filled with water, because at this moment the entire surface of the electrodes 11, 11' is covered causing them to operate at their maximum capacity. Even before this maximum yield is reached, part of the hot water has entered into the pipe 4 leading to the granulated material and when the boiler 10 is full and a violent explosion is caused, the portion of steam entering into this pipe 4 urges the boiling water, which is already in the same, on towards the container 6 holding the granulated material, where the boiling water acts as a solvent. The other part of the steam momentarily stops the inflow from the tank 7 by obstructing the pipe 16, whereby the whole content of the boiler 10 can be evaporated, whilst the third part, entering the tank 7 through the upper pipe 17 increases the pressure in the same, at the precise moment when the steam which has entered through the lower pipe 16 is already condensed. Thus the whole device works like a differential boiler.

The apparatus works by means of automatic pulsation consuming current only when the little boiler 10 contains water.

This represnts another advantage of the invention. When there is no water in the tank 7 and, therefore, neither in the boiler 10, the apparatus need not be switched off inasmuch as, even should the lever 15 be pressed down, the circuit could not be closed.

Furthermore, the apparatus begins to function immediately when it is switched on and stops as soon as the current is cut, due to the absence of thermal residues, which implies that it is apt not only for public places with an appreciable consumption of coffee, but also for domestic use in order to prepare a single cup of any desired infusion. The consumption of electric current varies according to the number of cups which are being prepared.

The new system can therefore be applied to small machines, as for instance the one illustrated in the drawings, or to large machines for public houses. In this latter case the capacity of the machine depends on the size of the tank 7 and the power of the boiler 10.

Lastly, there is no danger of the steam burning the granulated material, which is important in the case of tea or yerba mate, but also affects the preparation of coffee. In the new machine the granulated material is not penetrated by dry steam but by boiling water urged on by steam which, upon contacting the water in the pipe begins to condense before reaching the filter 5. Furthermore, due to the lack of a constant pressure in the water contained in the tank and the aforementioned difference of levels, there is no danger of cold water reaching the granulated material, whether or not the machine is connected and the electric circuit closed.

Having thus described a preferred embodiment of the invention, it is obvious that the same is not restricted thereto, but is broad enough to cover all structures coming within the scope of the annexed claims.

What I claim is:

1. An electric apparatus for preparing infusions through distillation comprising an electrically heated pulsating vaporizer of automatically pulsating action, a completely closed water tank sealed from the outside, a filtering container constantly attached to the apparatus during the operation of same, but removably connected to the apparatus and filled with granulated material which is to be extracted, said pulsating vaporizer including a narrow, electrically insulated boiler of reduced capacity wherein are housed two vertically disposed long electrodes which are insulated from each other and from the boiler, said boiler being vertically disposed in the apparatus at a level lower than said tank, two pipes of reduced diameter leading from different portions of said boiler to the tank, the first of said pipes connecting the lower portion of the boiler with the lower portion of the tank and the second pipe of identical cross-section connecting the upper portion of the boiler with the upper portion of said tank, a third pipe of larger diameter than said first and second pipes leading from said boiler from an intermediate portion between the upper and the lower portions of same below the level of liquid in said boiler and from a level lower than that of said second pipe such as to produce a pressure differential on the liquid contained in said water tank, the discharge of hot water from said boiler through said third pipe being controlled by the intermittent pressure differential conditions in said first and second pipes and said water tank whereby hot water will be discharged from said boiler to said filtering container and water from said water tank will be intermittently fed to said boiler immediately thereafter due to the successive pressure differentials on the water in said water tank.

2. An electric apparatus for preparing infusions through distillation comprising an electrically heated pulsating vaporizer of automatically pulsating action, a completely closed water tank sealed from the outside, a filtering container constantly attached to the apparatus during the operation of same and removably connected to the apparatus and filled with granulated material which is to be extracted, said pulsating vaporizer including a narrow, electrically insulated boiler of reduced capacity wherein are housed two vertically disposed elongated electrodes which are insulated from each other and from the boiler, said boiler being vertically disposed in the apparatus at a level lower than said tank, two pipes of reduced diameter leading from different portions of said boiler to the tank, the first of said pipes connecting the lower portion of the boiler with the lower portion of the tank and the second pipe of identical cross-section connecting the upper portion of the boiler with the upper portion of said tank, a third pipe of larger diameter than said first and second pipes leading from said boiler from an intermediate portion between the upper and lower portions of same below the level of liquid in said boiler and from a level lower than that of said second pipe such as to produce a pressure differential on the liquid contained in said water tank, the pulsating action of said pulsating vaporizer being automatically controlled by the differential pressure in said water tank and level of the water in said boiler whereby hot water will be discharged from said boiler to said filtering container and water from said water tank will be intermittently fed to said boiler immediately thereafter due to the successive pressure differentials on the water in said water tank.

3. In an apparatus for preparing infusions through distillation comprising a hollow casing having upper and lower horizontally extending portions in spaced apart relation, a completely closed water tank in said casing, a filtering container located in the upper horizontal extension of said casing adapted to be filled with granulated material to be extracted, an elongated cylindrical boiler of reduced capacity mounted in said casing and arranged below the level of said water tank, a pair of electrodes projecting into said boiler arranged in spaced apart relation from one end thereof and insulated from one another and from said boiler, a pair of pipes of reduced diameter leading from said water tank to said boiler with the first of said pipes connecting the lower portion of the boiler with the lower portion of said tank and the second of said pipes being connected to the upper portion of said boiler and the upper portion of said water tank, a third pipe of slightly increased diameter than said first and second pipe leading from the intermediate portion of said boiler below the liquid level therein to the upper portion of said filtering container and extending a distance slightly above the upper portion of said water tank, an electric circuit for said electrodes adapted to be connected to a source of electrical energy such that when said electrodes are energized the water in said boiler will be placed in circuit therewith and immediately heated to create a pressure differential on the liquid in said water tank and permit the water in said boiler to be forcefully discharged through said filtering container, the operation of said apparatus being such as to automatically produce a pulsating action in which water is fed to said boiler and discharged therefrom in succession due to the pressure differential in said first and second pipes acting on the body of water in said water tank.

References Cited in the file of this patent

UNITED STATES PATENTS

| 1,665,793 | Sanborgh | Apr. 10, 1928 |
| 1,831,013 | Kouyoumjian | Nov. 10, 1931 |
| 1,848,627 | Head | Mar. 8, 1932 |
| 1,940,775 | Smith | Dec. 26, 1933 |
| 2,568,474 | Van Sciver | Sept. 18, 1951 |

FOREIGN PATENTS

| 380,414 | Great Britain | Sept. 15, 1932 |
| 644,253 | Germany | Apr. 27, 1937 |
| 672,780 | Germany | Mar. 9, 1939 |